(12) United States Patent
Pettersen

(10) Patent No.: US 8,211,329 B2
(45) Date of Patent: Jul. 3, 2012

(54) LUBRICANT COMPOSITION AND METHODS OF MANUFACTURE THEREOF

(75) Inventor: Eric Maddocks Pettersen, Colorado Springs, CO (US)

(73) Assignee: Greengold Lubricants, LLC, Torrington, CT (US)

( * ) Notice: Subject to any disclaimer, the term of this patent is extended or adjusted under 35 U.S.C. 154(b) by 282 days.

(21) Appl. No.: 12/567,265

(22) Filed: Sep. 25, 2009

(65) Prior Publication Data
US 2010/0078588 A1 Apr. 1, 2010

Related U.S. Application Data

(60) Provisional application No. 61/100,487, filed on Sep. 26, 2008.

(51) Int. Cl.
*C09K 5/04* (2006.01)
*C01G 39/06* (2006.01)

(52) U.S. Cl. ............ 252/68; 252/76; 508/167; 508/154; 508/166; 366/342; 366/343

(58) Field of Classification Search ............ 252/68, 252/76; 508/167, 154, 166; 366/342, 343
See application file for complete search history.

(56) References Cited

U.S. PATENT DOCUMENTS

| | | | |
|---|---|---|---|
| 5,207,936 A | 5/1993 | Anzai et al. | |
| 6,063,741 A * | 5/2000 | Naitoh et al. | 508/365 |
| 6,291,407 B1 * | 9/2001 | Reidmeyer | 508/114 |
| 6,689,722 B1 | 2/2004 | Holst-Grubbe et al. | |
| 7,244,696 B2 * | 7/2007 | Patel et al. | 508/150 |
| 2001/0015180 A1 | 8/2001 | Tinney | |
| 2003/0040444 A1 | 2/2003 | Garmier | |
| 2008/0171676 A1 * | 7/2008 | Kim et al. | 508/136 |
| 2008/0312111 A1 * | 12/2008 | Malshe et al. | 508/155 |
| 2009/0053268 A1 * | 2/2009 | DePablo et al. | 424/401 |
| 2009/0090128 A1 * | 4/2009 | Kaneko | 62/498 |
| 2009/0277212 A1 * | 11/2009 | Kaneko et al. | 62/468 |
| 2010/0197536 A1 * | 8/2010 | Mosier et al. | 508/167 |

FOREIGN PATENT DOCUMENTS

| | | |
|---|---|---|
| EP | 0699739 A2 | 3/1996 |
| WO | WO 2007082299 A2 * | 7/2007 |

OTHER PUBLICATIONS

International Search Report dated May 11, 2010 for International Application No. PCT/US2009/058378.
Written Opinion dated May 11, 2010 for International Application No. PCT/US2009/058378.
Akbar, Emil et al.; "Characteristic and Composition of Jatropha Curcas Oil Seed from Malaysia and its Potential as Biodiesel Feedstock Feedstock," European Journal of Scientific Research, ISSN 1450-216X vol. 29, No. 3 (2009), pp. 396-403.

* cited by examiner

*Primary Examiner* — Douglas McGinty
(74) *Attorney, Agent, or Firm* — Cantor Colburn LLP

(57) ABSTRACT

Disclosed herein is a lubricant composition comprising soybean oil; and molybdenum disulfide; the molybdenum disulfide being dispersed in the soybean oil. Disclosed herein too is a method comprising agitating molybdenum disulfide with soybean oil in a reactor; the mixing being conducted in the presence of a magnetic field that is greater than the earth's field and an electrical field. Disclosed herein too is a coolant composition comprising water; soap and/or a surfactant; and a lubricant composition; the lubricant composition comprising soybean oil and molybdenum disulfide. Disclosed herein too is a method of manufacturing a coolant composition comprising mixing a lubricant composition, water and soap; the lubricant composition comprising a base oil and a metal sulfide.

24 Claims, 1 Drawing Sheet

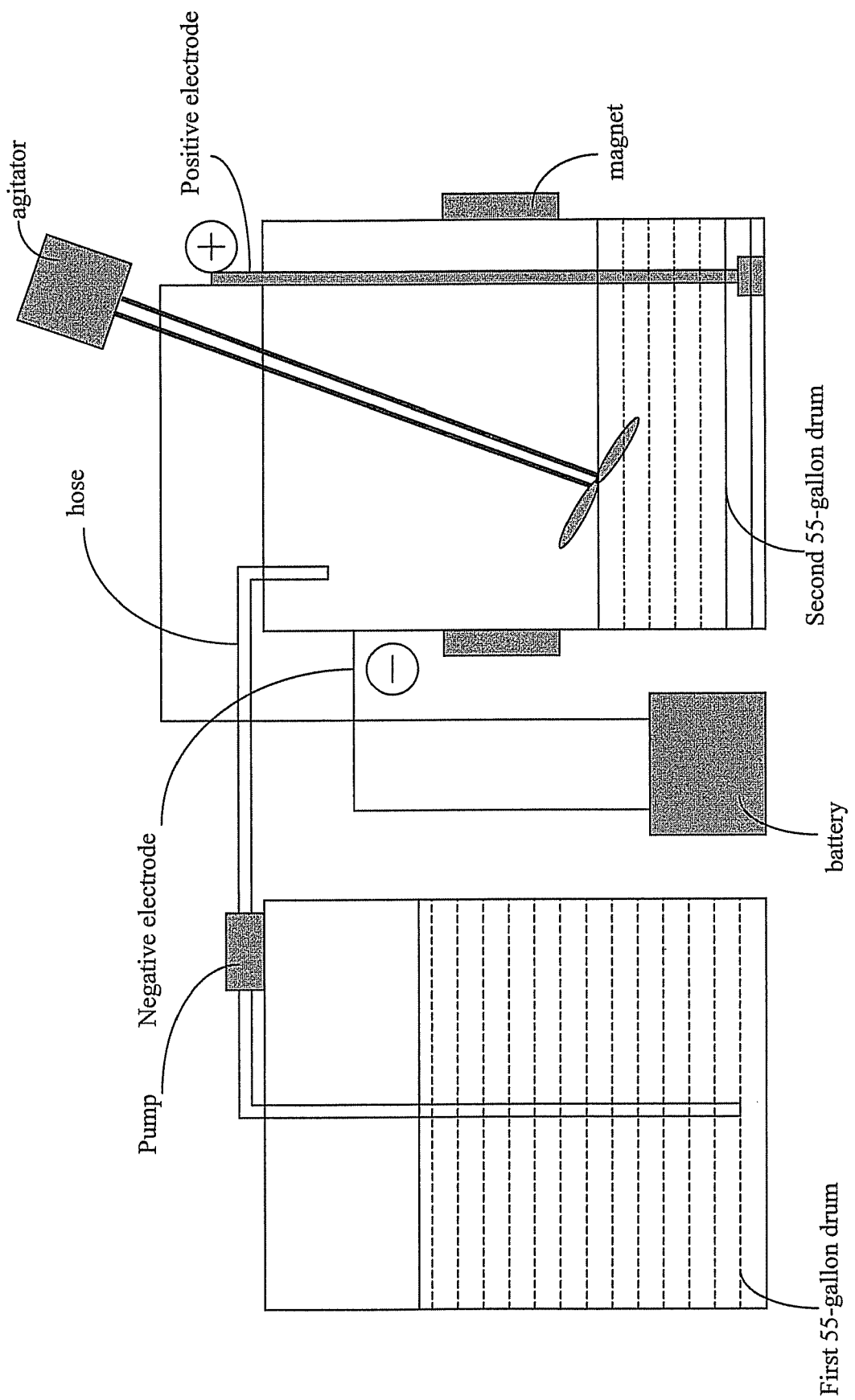

LUBRICANT COMPOSITION AND METHODS OF MANUFACTURE THEREOF

CROSS-REFERENCE TO RELATED APPLICATIONS

This application claims priority to provisional application 61/100,487 filed on Sep. 26, 2008, the entire contents of which are hereby incorporated by reference.

BACKGROUND

This disclosure relates to a lubricant composition and to methods of manufacture thereof. This disclosure also relates to a coolant composition and to methods of manufacture thereof.

Lubricants are used in machining to reduce friction between the cutting tool and the surfaces that are being machined. Lubricants also function as coolants and carry away heat generated during machining in operations such as grinding, drilling, milling, and cutting. The quality of a lubricant greatly affects the cost of a production operation since the efficiency, service life and other aspects of performance of both the tool and the machine are affected by the quality of the lubricant. As a result, increasing demands are placed upon lubricants.

During machining, vapors from the lubricant are often emitted into the atmosphere. Lubricants used in machining are often discarded at waste management sites or discharged into the ground after usage. It is therefore desirable to use lubricants that are not detrimental to the health of living beings and are environmentally friendly in addition to improving the performance of machining operations.

SUMMARY

Disclosed herein is a lubricant composition comprising soybean oil; and molybdenum disulfide; the molybdenum disulfide being dispersed in the soybean oil.

Disclosed herein too is a method comprising agitating molybdenum disulfide with soybean oil in a reactor; the mixing being conducted in the presence of a magnetic field that is greater than the earth's field and an electrical field.

Disclosed herein too is a coolant composition comprising water; soap and/or a surfactant; and a lubricant composition; the lubricant composition comprising soybean oil and molybdenum disulfide.

Disclosed herein too is a coolant composition comprising water; soap and/or a surfactant; and a lubricant composition; the lubricant composition comprising a base oil and a metal sulfide.

Disclosed herein too is a method of manufacturing a coolant composition comprising mixing a lubricant composition, water and soap; the lubricant composition comprising a base oil and a metal sulfide.

Disclosed herein too is a lubricant composition comprising a base oil; and metal disulfide particles; the metal disulfide particles being dispersed in the base oil in the presence of an electrical field and a magnetic field.

BRIEF DESCRIPTION OF FIGURES

The FIGURE is a depiction of the set-up to manufacture the lubricant composition.

DETAILED DESCRIPTION

Disclosed herein is a lubricant composition that is environmentally friendly and that can significantly reduce costs by improving tool life and machine life during machining operations. The lubricant composition advantageously comprises a base oil having metal sulfide particles dispersed therein. The metal sulfide particles are suspended in the base oil and remain in suspension in larger amounts for significantly larger periods of time compared with other comparative lubricant compositions. Disclosed herein too is a coolant composition that comprises the lubricant composition, a surfactant and/or a soap and water.

Disclosed herein too is a method of manufacturing a lubricant composition that comprises dispersing metal disulfide particles in a base oil while subjecting the lubricant composition to an electrical field as well as to a magnetic field. In one embodiment, the dispersing is accomplished by the application of shear forces to the lubricant composition while simultaneously subjecting the lubricant composition to an electrical field and to a magnetic field. Disclosed herein too is a method of manufacturing the coolant composition.

The base oil can be an oil derived from crude, from biological products, from agricultural products, from forest products, or the like, or from a combination comprising at least one of the foregoing oils. Examples of oils derived from crude are petroleum-based oils. Examples of base oils derived from biological products are algae oil, animal fat oils and tallow, fish oils, vegetable oil, waste vegetable oil, or the like, or a combination comprising at least one of the foregoing base oils derived from biological products. Examples of oil derived from agricultural products are soybean oil, rapeseed oil (canola), castor bean oil, sunflower seed oil, peanut oil, corn oil, safflower seed oil, linseed oil, jatropha oil, or the like, or a combination comprising at least one of the foregoing oils derived from agricultural products. Examples of oils derived from forest products are apricot seed oils, mango oil, coconut oil, cashew nut oil, or the like, or a combination comprising at least one of the foregoing oils derived from forest products. In one exemplary embodiment, the base oil is soybean oil.

The soybean oil can be saturated or unsaturated. In one embodiment, the soybean oil can comprise $C_{12}$-$C_{20}$ saturated fatty acids. In another embodiment, the soybean oil comprises oleic acids. For example, the soybean oil can comprise 16:1 (palmitioleic acid), 18:1 (oleic acid), 18:2 (linoleic acid) and 18:3 (linolenic acid). In one embodiment, it is desirable for the soybean oil to contain up to about 85 wt % oleic acid. An exemplary soybean oil is AP-82 obtained from Cargill.

In one embodiment, the base oil has an acid value of 30 to 40, a saponification value of 190 to 199. In one embodiment, the base oil has a palmitic acid content of 3.5 to 5 weight percent, based upon the total weight of the base oil. In another embodiment, the base oil has an oleic acid content of about 40 to about 50 wt % oleic acid, and about 30 to about 40 wt % linoleic acid, based upon the total weight of the base oil.

In an exemplary embodiment, the base oil has an oleic acid content of about 42 to about 45 wt % oleic acid, and about 32 to about 35 wt % linoleic acid, based upon the total weight of the base oil.

The base oil can also be an algae oil obtained from a plant or an alga. Lipid or oil-producing algae can include a wide variety of algae, although not all algae produce sufficient oil, as mentioned above. The most common oil-producing algae can generally comprise the diatoms (bacillariophytes), green algae (chlorophytes), blue-green algae (cyanophytes), and golden-brown algae (chrysophytes). In addition a fifth group known as haptophytes may be used. Exemplary species for extracting algal oil are *Botryococcus braunii, Chlorella, Dunaliella tertiolecta, Gracilaria, Pleurochrysis carterae, Sargassum*, or the like, or a combination comprising at least one of the foregoing species.

Examples of bacillariophytes capable of oil production include the genera *Amphipleura, Amphora, Chaetoceros, Cyclotella, Cymbella, Fragilaria, Hantzschia, Navicula, Nitzschia, Phaeodactylum, Thalassiosira*, or the like, or a combination comprising at least one of the foregoing bacillariophytes. Examples of chlorophytes capable of oil production include *Ankistrodesmus, Botryococcus, Chlorella, Chlorococcum, Dunaliella, Monoraphidium, Oocystis, Scenedesmus, Tetraselmis*, or the like, or a combination comprising at least one of the foregoing or the like, or a combination comprising at least one of the foregoing bacillariophytes. In one aspect, the chlorophytes can be *Chlorella* or *Dunaliella*. Specific non-limiting examples of cyanophytes capable of oil production include *Oscillatoria* and *Synechococcus*. A specific example of chrysophytes capable of oil production includes Boekelovia. Specific non-limiting examples of haptophytes include *Isochrysis* and *Pleurochysis*.

In an embodiment wherein the organism is an algae, the algae can be any from the genuses including *Dunaliella, Chlorella, Nannochloropsis*, or *Spirulina*. The organism can be *Dunaliella Bardawil, Dunaliella salina, Dunaliella primolecta, Chlorella vulgaris, Chlorella emorsonii, Chlorella minutissima, Chlorella protothecoides, Chlorella sorokiniana, Chlorella vulgaris, Spirulina platensis, Cyclotella cryptica, Tetraselmis suecica, Monoraphidium, Botryococcus braunii, Stichococcus, Haematococcus pluvialis, Phaeodactylum tricornutum, Tetraselmis suecica, Isochrysis galbana, Nannochloropsis, Nitzschia closterium, Phaeodactylum tricornutum, Chlamydomas perigranulata, Synechocystisf, Tagetes erecta, Tagetes patula*.

The metal sulfide particles can be molybdenum disulfide, antimony trisulfide, antimony pentasulfide, or the like, or a combination comprising at least one of the foregoing metal sulfides. An exemplary metal sulfide is molybdenum disulfide ($MoS_2$). An exemplary molybdenum disulfide is Tech Fine Grade $MoS_2$ that is commercially available from Rose Mill Company.

It is desirable for the metal sulfide particles to have an average particle size of up to about 6 micrometers prior to dispersion. In one embodiment, the metal sulfide particles have an average particle size of about 0.1 micrometers to about 5.5 micrometers after dispersion. In another embodiment, the metal sulfide particles have an average particle size of about 0.5 to about 5.0 micrometers after dispersion. In yet another embodiment, the metal sulfide particles have an average particle size of about 1.0 to about 4.0 micrometers after dispersion.

In one embodiment, it is desirable for the metal sulfide particles to have a minimum particle size that is greater than or equal to about 1.0 micrometer after dispersion. In another embodiment, it is desirable for the metal sulfide particles to have a minimum particle size that is greater than or equal to about 2.0 micrometers after dispersion. In yet another embodiment, it is desirable for the metal sulfide particles to have an average particle size of greater than or equal to about 3.0 micrometers after dispersion.

The metal sulfide particles may have particle sizes in the nanometer range. In one embodiment, it is desirable for the metal sulfide particles to be less than or equal to about 100 nanometers after dispersion. In another embodiment, it is desirable for the metal sulfide particles to be less than or equal to about 75 nanometers after dispersion. In yet another embodiment, it is desirable for the metal sulfide particle sizes to be less than or equal to about 50 nanometers after dispersion. In yet another embodiment, it is desirable for the metal sulfide particle sizes to be less than or equal to about 10 nanometers after dispersion.

It is desirable for the lubricant composition to contain the metal sulfide in an amount of about 0.1 pounds (lbs) to about 4 lbs per 11 gallons of the base oil. In one embodiment, the metal sulfide is present in an amount of about 0.5 to about 3 lbs per 11 gallons of the base oil. In another embodiment, the metal sulfide is present in an amount of about 0.8 to about 2.0 lbs per gallon of the base oil. In an exemplary embodiment, the metal sulfide is present in an amount of about 1.0 lbs per gallon of the base oil.

In one method of manufacturing the lubricant, the base oil is mixed with the metal sulfide in reactor to which is applied a magnetic field as well as an electrical field. The base oil is disposed in a reactor. The metal sulfide is added to the reactor gradually while the contents of the reactor are being agitated. A magnetic field and an electrical field are applied to the reactor during the agitation. The agitation is conducted for a period of about 1 minute to about 120 minutes. In one embodiment, the agitation can be achieved with a stirrer. In another embodiment, ultrasonic agitation can be used.

In one embodiment, the reactor is a 55 gallon drum. When the reactor is a 55 gallon drum, the metal sulfide is added to the base oil over a period of about 5 to about 35 minutes, specifically over a period of about 20 minutes. The stirring in the 55 gallon drum is conducted for a period of about 20 minutes beginning with the first addition of the metal sulfide to the 55 gallon drum.

The magnetic field is generally applied using regular magnets or electro-magnets. The magnets are generally applied to the outside of the reactor, though they can be applied to the inside of the reactor as well. The magnetic field applied across the reactor generally has a strength greater than the earth's magnetic field. The magnetic field has a strength of greater than or equal to about 3,000 gauss, preferably greater than or equal to about 6,000 gauss, preferably greater than or equal to about 9,000 gauss, preferably greater than or equal to about 12,000 gauss, and more preferably greater than or equal to about 20,000 gauss.

An electric field is also applied to the drum during the mixing of the base oil with the metal sulfide. The electric field can be applied using either a direct current (DC) voltage or using an alternating current (AC) voltage. In an exemplary embodiment, the electric field is applied using a DC voltage. The electric field is applied by placing the positive electrode in the reactor while the negative electrode is generally applied to the surface of the reactor.

The electric field is generally applied using a voltage of greater than or equal to about 3 volts, preferably greater than or equal to about 6 volts, preferably greater than or equal to about 9 volts and more preferably greater than or equal to about 12 volts.

It is generally desirable for the electrical field and the magnetic field to be applied simultaneously. However, they may also be applied sequentially if desired. Thus the electrical field can be applied prior to applying the magnetic field or vice versa. In one embodiment, only an electrical field may be applied to reactor.

The lubricant composition thus made does not show any separation of the metal sulfide from the base oil for a period of greater than or equal to about 2 weeks, preferably greater than or equal to about 4 weeks, and more preferably greater than or equal to about 2 months. A lubricant composition manufactured by using an electrical field and a mechanical field displays a superior shelf-life performance when compared with lubricant compositions manufactured using only a magnetic field. In addition, lubricant compositions manufactured using both an electrical field and a magnetic field display superior lubricating properties during machining. Tool performance and machine performance is significantly enhanced when compared with tool and machine performance attained when using a lubricant composition that is manufactured by using only a magnetic field during the agitation.

The lubricant composition can also advantageously be converted to a coolant by adding water and a surfactant and/or a soap to the lubricant composition. The coolant is used to cool machine tools and machined components during the machining operation.

A variety of surfactants may be used. Examples of suitable surfactants are anionic surfactants, cationic surfactants, nonionic surfactants, zwitterionic surfactants, or a combination comprising at least one of the foregoing surfactants.

In one embodiment, soap can be added to the lubricant composition to produce the coolant. The soap can be commercially available hand soap. A suitable example of a hand soap is Tackle Hand Cleaner commercially available from E-Z Way Products in Waterbury Conn.

The soap is generally added in an amount of about 0.01 to about 5 gallons per gallon of the lubricant composition. In one embodiment, the hand soap is added in an amount of about 0.1 to about 4.5 gallons per gallon of the lubricant composition. In another embodiment, the hand soap is added in an amount of about 0.2 to about 3 gallons per gallon of the lubricant composition.

The water is added in an amount of about 0.01 to about 50 gallons per gallon of the lubricant composition. In one embodiment, the water is added in an amount of about 0.1 to about 45 gallons per gallon of the lubricant composition. In another embodiment, the water is added in an amount of about 0.5 to about 40 gallons per gallon of the lubricant composition. It is to be noted that the water along with the soap and/or surfactant can be added at the source or alternatively, the lubricant composition and the water along with the soap and/or surfactant added later.

In one embodiment, the water and soap are added to the lubricant composition in a drum. During the addition, the contents of the drum are agitated to produce the coolant. The coolant thus manufactured can be stored for extended periods of time and used when desired.

The following examples, which are meant to be exemplary, not limiting, illustrate compositions and methods of manufacturing of some of the various embodiments of the lubricant compositions described herein.

EXAMPLES

Example 1

This example was conducted to demonstrate one manner of manufacturing the lubricant composition. The set-up for manufacturing the lubricant composition is shown in the FIGURE.

As can be seen in the FIGURE, a first 55-gallon drum and a second 55-gallon drum are placed next to one another. The first 55-gallon drum contains AP-82 a soybean oil purchased from Cargill. The second 55-gallon drum is empty and is fitted with a pair of 150 lb magnets. The magnets are placed on the outer surface of the drum and are opposedly disposed to one another. The magnets are placed approximately at the center of the height of the drum. The second 55-gallon drum is also fitted with electrodes. The positive electrode is placed inside the drum and is vertically supported in the drum upon a rubber pad. The negative electrode is affixed directly to the second 55-gallon drum. Both electrodes are connected to a 12 volt direct current power supply. The second 55-gallon drum is fitted with a stirrer to facilitate agitation of the contents of the drum.

A hose connects the first 55-gallon drum to the second 55-gallon drum. The hose is in communication with a Flotec utility pump that pumps the AP-82 soybean oil from the first 55-gallon drum to the second 55-gallon drum. The end of the hose in the second 55-gallon drum is at least 4 inches from the top to minimize any spillage or leakage from the second 55-gallon drum.

The Flotec pump is then turned on. The pump discharges the soybean oil from the first 55-gallon drum to the second 55-gallon drum at a rate of approximately 350 gallons per hour. Once the oil has been emptied into the second 55-gallon drum, the magnets are turned on, as is the DC voltage supply. The stirrer is started to agitate the soybean oil in the second 55-gallon drum. Once a vortex is created in the drum, molybdenum sulfide is added to the second 55-gallon drum. The molybdenum disulfide is added using a scoop that has the volume of a single cup. A total of 5 lbs of the molybdenum sulfide is added to the second 55-gallon drum scoop by scoop. The addition of the molybdenum sulfide in this manner prevents agglomeration. After the addition of the 5 lbs of molybdenum disulfide is completed, the agitation using the stirrer is continued for a period of 20 minutes. As noted above, the stirring is conducted with the soybean oil and molybdenum disulfide being subjected to a magnetic field (provided by the magnets) and an electrical field (provided by the DC voltage). During the course of the agitation, the molybdenum disulfide is suspended in the soybean oil to form the lubricant composition.

Example 2

This example was conducted to demonstrate the method of manufacturing the coolant composition.

The lubricant composition prepared in the Example 1 is diluted with water. Water is first added to the lubricant composition in an amount of about 20 to about 50 wt % based on the total weight of the mixture of water and the lubricant composition. The mixture of the water and the lubricant composition is then mixed with Tackle Hand Soap in a 5 gallon pail to form the coolant. One gallon of soap was added for every 5 gallons of the lubricant composition. It is to be noted that the hand soap can be added to the lubricant composition to form a hand soap-lubricant composition mixture. The hand soap-lubricant composition mixture is then supplied to a customer who can add water to it to form the coolant composition.

Both the lubricant composition and the coolant composition described above are superior to other commercially available lubricants and coolants. They display longer shelf lives when compared with other commercially available lubricants and coolants. They also perform better as lubricants and coolants in actual machinery and in real world manufacturing and operating conditions. In addition, they are environmentally friendly.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A lubricant composition comprising:
   soybean oil; and
   molybdenum disulfide; the molybdenum disulfide being dispersed in the soybean oil in the presence of an electrical field, wherein the electric field is applied using a voltage greater than or equal to about 3 volts, further wherein the molybdenum disulfide comprises particles having an average particle size of about 10 to about 100 nanometers after becoming a part of the lubricant composition.

2. The lubricant composition of claim 1, wherein the soybean oil is a saturated oil.

3. The lubricant composition of claim 1, wherein the soybean oil is an unsaturated oil.

4. The lubricant composition of claim 1, wherein the soybean oil comprises $C_{12}$-$C_{20}$ saturated fatty acids.

5. The lubricant composition of claim 1, wherein the lubricant composition comprises about 0.1 pounds to about 4 pounds of molybdenum disulfide per 11 gallons of the soybean oil.

6. The lubricant composition of claim 1, further comprising canola oil.

7. The lubricant composition of claim 1, further comprising a petroleum based oil.

8. A lubricant composition comprising:
   a vegetable oil; and
   molybdenum disulfide particles; the molybdenum disulfide particles being dispersed in the vegetable oil in the presence of an electrical field and a magnetic field, wherein the electric field is applied using a voltage greater than or equal to about 3 volts, further wherein the molybedenum sulfide particles have an average particle size of about 10 to about 100 nanometers after becoming a part of the lubricant composition.

9. The lubricant composition of claim 8, wherein the vegetable oil is a soybean oil, a canola oil, a castor bean oil, a sunflower seed oil, a peanut oil, a corn oil, a safflower seed oil, a linseed oil, jatropha oil, an apricot seed oil, a mango oil, a coconut oil, a cashew nut oil, or a combination comprising at least one of the foregoing base oils.

10. A method comprising:
    agitating molybdenum disulfide with a vegetable oil; the agitating being conducted in the presence of a magnetic field that is greater than the earth's field and an electrical field, wherein the electric field is applied using a voltage greater than or equal to about 3 volts, further wherein the molybdenum disulfide comprises particles having an average particle size of about 10 to about 100 nanometers after becoming a part of the lubricant composition.

11. The method of claim 10, wherein the agitating comprises stirring.

12. The method of claim 10, wherein the magnetic field has a strength of greater than or equal to about 3,000 gauss.

13. The method of claim 10, wherein the magnetic field has a strength of greater than or equal to about 20,000 gauss.

14. The method of claim 10, wherein the electric field is applied using a direct current voltage to the reactor.

15. The method of claim 14, wherein the direct current is greater than or equal to about 6 volts.

16. The method of claim 14, wherein the direct current is greater than or equal to about 12 volts.

17. A coolant composition comprising:
    water;
    soap and/or a surfactant; and
    the lubricant composition of claim 1.

18. The coolant composition of claim 17, wherein the soap and/or surfactant is generally added in an amount of about 0.01 to about 5 gallons per gallon of the lubricant composition.

19. The coolant composition of claim 17, wherein the water is added in an amount of about 0.01 to about 50 gallons per gallon of the lubricant composition.

20. The coolant composition of claim 17, wherein the soap is present in an amount of about 1 weight percent to about 5 weight percent, based on the total amount of the coolant composition.

21. A coolant composition comprising:
    water;
    soap and/or a surfactant; and
    the lubricant composition of claim 8.

22. The coolant composition of claim 21, wherein the vegetable oil is soybean oil.

23. A method of manufacturing a coolant composition comprising:
    mixing a lubricant composition, water and soap; the lubricant composition comprising a vegetable oil and a molybdenum disulfide, the molybdenum disulfide being dispersed in the vegetable oil in the presence of an electrical field, wherein the electric field is applied using a voltage greater than or equal to about 3 volts, further wherein the molybedenum disulfide comprises particles having an average particle size of about 10 to about 100 nanometers after becoming a part of the lubricant composition.

24. The method of claim 23, wherein the vegetable oil is soybean oil.

* * * * *